United States Patent [19]

Bolt et al.

[11] Patent Number: 5,061,663
[45] Date of Patent: Oct. 29, 1991

[54] AlN AND AlN-CONTAINING COMPOSITES

[75] Inventors: John D. Bolt, Landenberg, Pa.; Frederick N. Tebbe, Hockessin, Del.

[73] Assignee: E. I. Du Pont de Nemours and Company, Wilmington, Del.

[21] Appl. No.: 338,019

[22] Filed: Apr. 14, 1989

Related U.S. Application Data

[63] Continuation-in-part of Ser. No. 76,182, Jul. 27, 1987, abandoned, which is a continuation-in-part of Ser. No. 903,448, Sep. 4, 1986, Pat. No. 4,696,968.

[51] Int. Cl.$^5$ .............................................. C04B 35/58
[52] U.S. Cl. ..................................... 501/95; 423/412; 501/87; 501/92; 501/96
[58] Field of Search ........................... 501/96, 98, 95; 423/412

[56] References Cited

U.S. PATENT DOCUMENTS

| | | | |
|---|---|---|---|
| 3,505,246 | 4/1970 | Ehrich et al. | 260/2 |
| 3,529,044 | 9/1970 | Santangelo | 264/29 |
| 3,651,112 | 3/1972 | Sinn et al. | 260/448 A |
| 3,658,979 | 4/1972 | Dunn et al. | 264/176 |
| 3,846,527 | 11/1974 | Winter et al. | 264/63 |
| 4,010,223 | 3/1977 | Winter et al. | 264/63 |
| 4,179,459 | 12/1979 | Dozzi et al. | 260/448 R |
| 4,650,777 | 3/1987 | Kurokawa et al. | 501/96 |
| 4,672,046 | 6/1987 | Sawamura et al. | 501/96 |
| 4,719,187 | 1/1988 | Bardhan et al. | 501/96 |
| 4,740,574 | 4/1988 | Bolt et al. | 528/9 |
| 4,755,491 | 7/1988 | Miwa | 501/96 |
| 4,761,388 | 8/1988 | Oguri et al. | 501/95 |
| 4,764,321 | 8/1988 | Huseby et al. | 501/96 |
| 4,803,183 | 2/1989 | Schwetz et al. | 501/96 |

FOREIGN PATENT DOCUMENTS

| | | |
|---|---|---|
| 839321 | 4/1970 | Canada . |
| 213629 | 3/1987 | European Pat. Off. . |
| 2096394 | 2/1972 | France . |
| 54-13439 | 5/1979 | Japan . |
| 124626 | 6/1986 | Japan . |
| 477139 | 7/1975 | U.S.S.R. ................................ 501/95 |
| 936544 | 9/1963 | United Kingdom . |

OTHER PUBLICATIONS

Interrante, Abstract of Materials Research Society Meeting, Apr., 1986, at Palo Alto, Calif.

Bähr, Fiat, Rev. Ger. Sci., Inorg. Chem. II, 155-179 (1948).

Laubengayer et al., "Aluminum Nitrogen Polymers by Condensation Reactions", J. Amer. Chem. Soc. 83, pp. 542-546 (1961).

Gribkov et al., "Strength of Aluminum Nitride Whiskers", translated from Izvestiya Akademii Nauk SSSR, Neorganicheskie Materialy vol. 13 (10), pp. 1775-1778 (1977).

Portnoi et al., "Role of Liquid Drops in the Growth of Filamentary Crystals of Aluminum Nitride", translated from Izvestiya Akademii Nauk SSSR, Neorganicheskie Materialy, vol. 6 (10), pp. 1762-1767 (1970).

Portnoi et al., "Growth of AlN Whiskers During Nitriding of Aluminum", translated from Poroshkovaya Metallurgivy No. 5 (89), pp. 10-14 (1970).

Chem. Abstracts, vol. 89 (20), 13 Nov. 78, p. 120, abstract No. 165623f.

*Primary Examiner*—Wayne A. Langel

[57] ABSTRACT

Shaped articles of polycrystalline AlN and AlN-containing composites; the AlN articles having thermal conductivities of at least about 70 W/mK (watts/meter °K); the AlN component effecting good thermal conductivity in the composited articles.

6 Claims, No Drawings

ALN AND ALN-CONTAINING COMPOSITES

CROSS-REFERENCE TO RELATED APPLICATION

This is a continuation-in-part of copending application bearing U.S. Ser. No. 07/076,182 filed on July 27, 1987, abandoned, which is a c-i-p of application bearing U.S. Ser. No. 903,448 filed on Sept. 4, 1986, U.S. Pat. No. 4,696,968.

BACKGROUND OF THE INVENTION

Conversion of $(CH_3)_3Al$ and $NH_3$ to aluminum nitride is known: Bähr, FIAT, Rev. Ger. Sci., Inorg. Chem. II, 155 to 179 (1948). The reaction is as follows:

Laubengayer et al., J. Amer. Chem. Soc., 83, pages 542 to 546 (1961), disclose the reactions of amines at low temperatures with aluminum alkyls or alkyl aluminum chlorides to form 1:1 addition compounds. When such addition compounds having N-H and Al-R bonding are pyrolyzed, aluminum nitride is produced.

Interrante, in a meeting of the Materials Research Society, April, 1986, at Palo Alto, Calif., disclosed the conversion of $C_2H_5AlNH$ to aluminum nitride in the presence of ammonia. The aluminum nitride produced with ammonia contained less carbon than that formed without it. Interrante also disclosed that $C_2H_5AlNH$ is converted to aluminum nitride at 300° C. to 900° C. with retention of morphology.

Japanese Patent 54-13439 discloses a method for the production of aluminum nitride in the form of a powder.

Additional relevant background includes the following: Strength of Aluminum Nitride Whiskers, Gribkov et al., Izvestiya Akademii Nauk SSSR, Neorganicheskie Materialy, Vol. 13 (10) pages 1775 to 1778, (1977); Role of Liquid Drops in the Growth of Filamentary Crystals of Aluminum Nitride, Portnoi et al., Izvestiya Akademii Nauk SSSR, Neorganicheskie Materialy, Vol. 6 (10) pages 1762 to 1767 (1970); Growth of AlN Whiskers During the Nitriding of Aluminum, Portnoi et al., Poroshkovaya Metallurgiya No. 5 (89) pages 10 to 14 (1970).

Canada 839,321 discloses AlN by carbothermal reduction of alumina. Fibers made according to the method disclosed in this patent contain excessive amounts of carbon. Japan 61-124626 discloses a method for making AlN fibers from aluminum metal fibers or from a solution of an aluminum compound. U.S. Pat. Nos. 3,846,527 and 4,010,233 make reference to metal nitride fibers. This route to AlN fibers uses the carbothermal reductive nitridation reaction with attendant problems of either excess O or C. Significant carbon residues also characterize the AlN fibers disclosed in U.S. Pat. Nos. 4,740,574. 3,529,044 discloses aluminum carbide and that if nitrogen is used, then metal nitride fibers result. The problem with such fibers would be the presence of too much C or O. U.S. Pat. No. 3,658,979 discloses large diameter fibers with a thin film of AlN on the surface. EPA 213,629 discloses aluminum nitride fibers prepared by heating precursor fibers, spun from a solution of aluminum oxychloride and polyvinyl alcohol, in nitrogen.

SUMMARY OF THE INVENTION

This invention concerns a shaped article of polycrystalline aluminum nitride having a thermal conductivity value of at least about 70 W/mK (watts/meter °K). Preferred articles are in the form of fibers and films. To achieve shaped articles, especially fibers, of good physical properties, it is preferred they have an actual oxygen content of at least 0.2% up to about 1.5 weight percent and a carbon content of not more than about 0.5 weight percent (preferably about 0.1 weight percent, or less). The thermal conductivity is measured by the longitudinal bar method or the laser flash method on a unidirectional composite of fibers in a relatively nonconductive matrix.

This invention also concerns a composite fiber of polycrystalline AlN in admixture with one or more of $SiO_2$, $Si_3N_4$, SiC, $Al_4C_3$, TiC, ZrC, $B_2O_3$, BN, $Al_2O_3$, $TiO_2$, TiN, $ZrO_2$, $Mg_2Al_4Si_5O_{18}$, $TiB_2$ and $ZrB_2$. This invention also concerns composites of polycrystalline AlN fibers in a matrix of organic polymer, inorganic polymer, metal, glass or a ceramic. Preferred composite shapes are fibers and films. The shaped aluminum nitride objects of this invention are characterized by high density which, in a preferred embodiment, is substantially equivalent to the theoretical density of aluminum nitride.

DETAILS OF THE INVENTION

The polymer precursor for the AlN-containing (include AlN) materials of this invention is made by combining $R_3Al$ and $R_2AlNH_2$ (individually synthesized) in the proper molar ratio, and heating; or, by adding $NH_3$ to $R_3Al$ to generate in situ the desired molar ratio of $R_3Al$ and $R_2AlNH_2$, followed by heating.

The viscosity of the polymer varies with the reaction time and temperature as well as the quantity of $R_3Al$ supplied to the system. The polymer can be made as a viscous liquid, or a glassy solid which is converted at temperatures above 40° C. to a viscous liquid. Fibers, even continuous fibers, can be drawn from the melt and cooled to ambient temperatures with retention of fiber morphology. Alternatively, fibers can be drawn from compositions made by plasticizing the polymer with common organic solvents such as methylene chloride, n-hexane, cyclohexane, toluene, and the like, and evaporating solvent from the polymer, with preservation of the fibrous morphology. Fibers also can be prepared by pulling with a glass rod dipped into the molten or plasticized polymer or by use of conventional melt-spinning equipment.

Treatment of the polymer in whatever form or shape with ammonia, hydrazine or similar nitrogen-containing compound cures it so that it is no longer fusible. One typical method for curing the polymer is to treat it in a stream of gas containing about 10% to 99% ammonia in nitrogen, or pure ammonia, at a pressure of about 1 mm to 10 atmospheres and at a temperature of about 50° C. to 175° C. Heating the cured polymer at about 800° to 1000° C. in the presence of ammonia, hydrazine or the like will convert it to high purity aluminum nitride. The density of the aluminum nitride so produced can be increased by heating it to about 1800° C. Shaped articles such as films, tapes, composites and the like, as well as fibers, can be prepared, cured and converted to aluminum nitride by the procedure described above.

When the measured oxygen content of the AlN fibers is less than about 0.2%, the AlN in the fibers does not fully sinter (densify). To achieve dense fibers at sintering temperatures of about 1700° to 1850° C. it is necessary to have small amounts of an impurity such as oxygen present. However, oxygen may lower thermal conductivity and therefore, it is desirable to have present only the minimum amount necessary to aid sintering.

One way to incorporate oxygen is to pass water vapor diluted with an inert gas through the $R_2AlNH_2$ that is used to make the thermoplastic polymer. Typically, water is added to the system, before sintering, to achieve a measured oxygen content of about 0.25 to 1.0 percent, based on final weight of AlN. The amount of oxygen in the sintered AlN object can decline slightly from the amount present before sintering when sintering is accomplished in an inert atmosphere in a carbon furnace. An oxygen content in the sintered object of between about 0.15 to 0.5 weight percent has been found consistent with acceptable thermal conductivities. While less than 0.15 weight percent of oxygen would be acceptable as well, values above about 0.5 may adversely affect thermal conductivity.

UTILITY AND COMPOSITE FORMATION

Composites including shaped composites are formed by adding an inorganic nitride, oxide, carbide or RAlNH (infusible) to the polymeric organoaluminum precursor of AlN, forming the shaped article, curing the polymer and heating to form a shaped article of aluminum nitride or aluminum nitride containing a disparate inorganic nitride, an oxide, a boride, or a carbide component. Inorganic nitrides, oxides, borides and carbides which can be used for preparation of the composites of this invention include $SiO_2$, $Si_3N_4$, SiC, TiC, ZrC, $B_2O_3$, BN, $Al_2O_3$, $TiO_2$, $Mg_2Al_4Si_5O_{18}$, $TiB_2$, $ZrB_2$ and $ZrO_2$, in addition to AlN. The amount of oxide, boride, nitride or carbide contained in the composite can be as high as 85% or more.

An alternative method for forming composites comprises adding an inorganic oxide or RAlNH to the polymer, forming the shaped article, exposing the shaped article to moisture to convert the polymer to $Al(OH)_3$, and heating at about 800° to 1800° C. to form a shaped article of alumina or alumina containing other inorganic oxides.

Films of AlN are prepared by applying a thin coating of the polymer on a substrate such as silicon metal, curing the polymer and heating at about 800° to 1800° C. to form a film of aluminum nitride on a substrate. Tapes are prepared by extruding the polymer from a die of appropriate thickness, curing, and heating at about 800° to 1800° to form tapes of aluminum nitride.

The polymer intermediate can be melt-shaped and converted to aluminum nitride of corresponding morphology by treatment in accordance with the foregoing description, or solubilized and shaped in accordance with liquid-handling techniques. The solvent can then be removed in any convenient manner and the polymer cured and converted to aluminum nitride.

The solutions can be spray-dried to produce polymer particles which can be cured and then heated to convert them to aluminum nitride of corresponding morphology. The polymer is combinable with other materials to form composites, reinforced materials, and the like. The shaped articles are useful in ceramic and heat conduction applications, especially in preparation of dense microcircuitry where heat generation is a problem.

All AlN-containing materials of this invention are useful to raise thermal conductivity values of matrices to which they are added. For instance, they can be added to any compatible organic or inorganic polymer, metal, glass or polycrystalline ceramic compositions to serve that function. The AlN can be admixed with the polymer, metal, glass, or ceramic precursor in any manner that will occur to one skilled in the art. Subsequent polymerization, polymer blending, metal, glass or ceramic formation will then result in a composited admixture having good thermal conductivity.

The following Examples illustrate the invention. Procedures and reactions were conducted under an atmosphere of nitrogen or, where noted, ammonia or ammonia-nitrogen mixtures.

Procedures for Making Polymer Precursor and Examples for Making AlN

PROCEDURE 1

With the exclusion of air and moisture triethylaluminum, 80 ml, in a 500 ml round-bottomed flask was stirred and treated with gaseous ammonia at 24° C. to 65° C. An excess of ammonia was supplied to insure that the reaction proceeded to completion. The reaction mixture consisted of $(C_2H_5)_2AlNH_2$ and ammonia. Excess ammonia was evaporated from the stirred mixture by warming it to 56° C. under a vacuum of about 0.1 torr. The product was $(C_2H_5)_2AlNH_2$.

A solution of the $(C_2H_5)_2AlNH2$ (2.5 g) and $(C_2H_5)_3Al$ (0.35 g) was heated at 144° C. to 164° C. for 0.5 hours. The product, a polymeric reaction product of amidodiethylaluminum and triethylaluminum, was a viscous liquid at the synthesis temperature.

PROCEDURE 2

Preparation of Polymer Fibers

A portion of the viscous liquid product from Procedure 1 was heated to 165° C. and fibers drawn from the melt. Upon cooling to ambient temperature the fibers were converted to a glassy solid with retention of the fiber morphology.

EXAMPLE 1

Preparation of AlN Fibers

The fibers from Procedure 2 were placed in a quartz tube and treated at ambient temperature overnight with a continuous flow of ammonia (10%) in nitrogen at atmospheric pressure. With continued flow of gas, the tube was heated. The temperature to which the tube was heated, the rate of increase of temperature, and the time at temperature was: 70° C., 1° C./min, 1.5 hr; 125° C., 1°/min, 1.5 hr; 150° C., 1°/min, 1.5 hr; 200° C., 1°/min, 1 hr; 280° C., 0.5°/,in, 1.5 hr; 300° C., 1°/min, 1.5 hr; 350° C., 1°/min, 1.5 hr; 900° C., 1°/min, 2 hr. The fibers so prepared were fine-grained ceramics with the X-ray powder pattern of aluminum nitride.

PROCEDURES 3 to 12

Preparation Polymer $(C_2H_5)_2AlNH_2$ and $(C_2H_5)_3Al$ were combined in the indicated ratio to form a solution which was heated as indicated in the following Table. In each experiment, the solution became more viscous with time, at the reaction temperatures. The solutions remained transparent for $(C_2H_5)_3Al$ mole fractions of 0.474 to 0.009. Fibers were drawn from the solutions of Procedures 4 through 12.

TABLE

| Procedure | Mole Fraction $(C_2H_5)_3Al)$ | Conditions |
|---|---|---|
| 3 | 0.474 | 162° to 168° C./60 min |
| 4 | 0.306 | 157° to 172° C./15 min |
| 5 | 0.228 | 161° to 171° C./15 min |
| 6 | 0.056 | 157° to 172° C./46 min |
| 7 | 0.049 | 158° to 167° C./57 min |
| 8 | 0.042 | 159° to 170° C./38 min |
| 9 | 0.029 | 168° to 170° C./25 min |
| 10 | 0.018 | 159° to 179° C./75 min |
| 11 | 0.009 | 150° to 179° C./59 min |
| 12 | 0.002 | 155° to 175° C./50 min |

EXAMPLES 2 to 10

Preparation of AlN Fibers

The polymers made by the Procedures 4 to 12 are converted to AlN fibers according to the procedure described with respect to Example 1.

PROCEDURE 13

A mixture of $Et_2AlNH_2$, 100 g, and $AlEt_3$, 2.0 g, was heated at 129° C. to 172° C. for 1 hr and 35 min. The temperature range during most of the reaction period was 159° to 173° C. The reaction was stopped after the evolution of 25.10 g of ethane. The reaction product was cooled to approximately 110° to 125° C., and vacuum was applied over a period of approximately 1 hr and 15 min to remove the small amount of ethane dissolved in the polymer. After removal of the dissolved gas, the polymer was cast in cylindrical plugs having the dimensions 0.75 inch X 3 inch.

EXAMPLE 11

Fibers were melt-spun from the polymer of Procedure 13 in a nitrogen filled dry-box from a single hole spinneret, 0.004 inch diameter by 0.008 inch long, at 113° C. Polymer was filtered through screens immediately preceeding the spinneret and after extrusion wound onto a bobbin at 115 m/min. The fibers were cut off the bobbin, removed as a skein, and transferred to a quartz pyrolysis tube while maintaining an inert atmosphere. The fibers were then pyrolyzed by heating in ammonia from room temperature to 150° C. at 3° C./min, from 150° C. to 300° C. at 5° C./min, then rapidly heating to 900° C. After cooling to room temperature, the fibers were transferred to a graphite resistance furnace and heated in nitrogen to 1706° C. The fibers were analyzed for carbon content and found to contain 0.07 percent carbon.

EXAMPLE 12

Another sample of fibers was prepared from the polymer of Procedure 13 by extrusion through a 0.010 inch diameter by 0.015 inch long spinneret at 103° C., and collected at 120 m/min. These fibers were pyrolyzed in ammonia in the same manner and heated to a final temperature of 1527° C. in nitrogen. The fibers were white and contained 0.13 percent carbon. The X-ray powder diffraction pattern showed aluminum nitride as the only detectable phase.

PROCEDURE 14

Polymer was prepared by the general method of Procedure 13 with production of 24.58 grams of ethane. The polymer was degassed and cast into cylindrical plugs.

EXAMPLE 13

In a nitrogen filled dry-box, fibers were spun from the polymer of Procedure 14 by extrusion through a single 0.006 inch diameter by 0.012 inch long spinneret hole using a back pressure of 600 psi. Spinneret temperature was 113° to 115° C. Fibers were wound onto bobbins at 147 m/min. As-spun fibers were removed from the bobbins as skeins and transferred to pyrolysis tubes. Fibers were heated in ammonia at 1.5° C./min to 250° C., then rapidly to 1000° C. The fibers were then transferred to a graphite resistance furnace and heated in nitrogen to 1750° C. Fibers were white and X-ray diffraction powder patterns showed aluminum nitride with a trace of aluminum oxynitride as a second phase.

To test the thermal conductivity of the AlN fibers a small uniaxial composite was prepared: 1.83 g of fibers were laid into a simple 2.25×0.5×0.125 inch mold along with enough room temperature curable epoxy resin (Buehler ® Epoxide, resin: hardener, 5:1) to fill the mold. After curing overnight in a laboratory press, the composite was removed from the mold. Resin-rich areas along the sides of the composite were trimmed. Using the guarded longitudinal bar method, thermal conductivity of the composite was measured to be 27 W/mK at 5° C. in the direction parallel to the fibers. The section used for thermal conductivity was analyzed for fiber volume fraction by measuring the volume and determining the amount of fiber present after burning out the epoxy resin. Burnout at 650° C. left a residue of AlN the weight of which was confirmed by conversion of the AlN to alumina at 1050° C. The calculated volume fraction of AlN in the composite was 0.33. The thermal conductivity of the fibers was calculated to be 81 W/mK.

The guarded longitudinal bar method utilized to measure thermal conductivity is operated as follows. Rod samples of length about 1.25" to 2" and of square, rectangular or circular cross-section between 1/16 and 1/64 sq inches are used. These are pre-drilled with four holes, one at each end and two spaced about ⅜ and ⅝ of the way along the sample. One end of the sample is attached to a temperature controlled cold sink while the sample heater is attached to the other end. Thermocouples are inserted onto the holes along the samples. The heat flow rate (dQ/dt) provided to the sample heater is measured using four-point electrical techniques. The temperature difference (dT) measured by the thermocouples, which are cross-calibrated at a range of temperatures, is combined with the separation of the thermocouples (dx), to provide the temperature gradient along the sample (dT/dx). The thermal conductivity is then determined from this equation where A is cross-sectional area:

$$(dQ/dt) = kA(dT/dx).$$

To minimize direct radiation heat losses, the sample is shielded along its entire length by a heated guard provided with a separate heater and separate thermocouples located directly opposite those on the sample. Computer control matches the temperature of a point on the sample to a parallel point on the guard thus providing a comparable temperature gradient in both sample and guard. The space between the sample and the guard is filled with a dispersed fibrous insulation to further reduce radiative losses. The sample and associated guard are mounted within a uniform temperature furnace which provides an operating ambient temperature corresponding to the temperature mid-point of the sample.

The entire experimental system of sample, guard and outer furnace is mounted in a vacuum and attached to a variable temperature cryo-pyrostat which can operate between 77° K. (−190° C.) and 573° K. (+300° C.). Liquid nitrogen is used as the coolant below room temperature and ice water as the coolant above room temperature. A temperature controller is used to maintain intermediate temperatures constant to 0.1° K. Experiment control and data acquisition is by micro-computer. The system is checked for consistency by periodic measurements of standard materials such as Armco Iron, high density sintered alumina and a specified glass. The lower limit of measurement on this system is about 1 W/mK. The accuracy of measurement is ±5% under normal conditions though it can be reduced to better than ±3% with special care.

The embodiments of the invention in which an exclusive property or privilege is claimed are as follows:

1. A shaped article in the form of a fiber of polycrystalline aluminum nitride having a thermal conductivity of at least about 70 W/mK.

2. A shaped article according to claim 1 having an oxygen content between about 0.5 to 1.5 weight percent and a carbon content of not more than about 0.5 weight percent.

3. A shaped article according to claim 2 having an oxygen content of about 0.5 weight percent or less.

4. A shaped article according to claim 1 having a density substantially equivalent to the theoretical density of aluminum nitride.

5. A shaped article according to claim 2 having a density substantially equivalent to the theoretical density of aluminum nitride.

6. A shaped article according to claim 3 having a density substantially equivalent to the theoretical density of aluminum nitride.

* * * * *